United States Patent
Kubis et al.

[11] 3,943,908
[45] Mar. 16, 1976

[54] ONE PIECE PISTON CONNECTED TO A CONNECTING ROD FOR HIGH SPEED FOUR-STROKE CYCLE INTERNAL COMBUSTION ENGINES

[75] Inventors: Heribert Kubis; Gerhard Deschler, both of Nurnberg, Germany

[73] Assignee: Maschinenfabrik Augsburg-Nurnberg Aktiengesellschaft, Nurnberg, Germany

[22] Filed: Nov. 2, 1973

[21] Appl. No.: 412,441

[30] Foreign Application Priority Data
Nov. 3, 1972 Germany.............. 2253868

[52] U.S. Cl................. 123/193 P; 92/187; 92/238; 403/152; 403/273
[51] Int. Cl.²............................................. F16J 1/14
[58] Field of Search..... 123/193 P, 193 CP; 92/238, 92/187; 403/273, 152; 148/14

[56] References Cited
UNITED STATES PATENTS

| | | | |
|---|---|---|---|
| 653,482 | 7/1900 | Morgan.................. | 403/152 |
| 1,115,176 | 10/1914 | Daniel.................. | 123/193 P |
| 1,403,064 | 1/1922 | Ungar................... | 403/273 |
| 2,058,618 | 10/1936 | Patzig.................. | 403/273 |
| 2,067,714 | 1/1937 | Kylen................... | 403/152 |
| 2,295,199 | 9/1942 | Carvelli................ | 92/238 |
| 2,575,427 | 11/1951 | Pavlock................. | 148/14 |
| 2,821,445 | 1/1958 | Gardner................. | 92/187 |
| 3,075,817 | 1/1963 | Mayes................... | 123/193 P |
| 3,403,605 | 10/1968 | Schmidt................. | 123/193 P |
| 3,479,929 | 11/1969 | Fangman................. | 92/187 |

FOREIGN PATENTS OR APPLICATIONS

| | | | |
|---|---|---|---|
| 1,126,318 | 7/1956 | France.................. | 123/193 P |
| 41,580 | 1/1916 | Sweden.................. | 123/193 P |
| 608,102 | 7/1926 | France.................. | 92/238 |

*Primary Examiner*—Charles J. Myhre
*Assistant Examiner*—Daniel J. O'Connor
*Attorney, Agent, or Firm*—Walter Becker

[57] ABSTRACT

A one piece piston connected to a connecting rod, for high speed four-stroke cycle internal combustion engines, in which the piston top has a centrally arranged spherical combustion chamber with a constricted opening while the piston is made of cast iron, preferably of tough cast iron, or spheroidal cast iron, or malleable cast iron, and while the piston skirt below the piston ring grooves has two flattened surfaces located opposite to each other and perpendicular to the axis of the piston bolt and parallel to the piston axis. The flat surfaces are located approximately along the same plane as the outer wall of the spherical combustion chamber while bearings for the piston bolt extend at least approximately from flat surface to flat surface and while the connecting rod is firmly shrunk onto the piston bolt.

6 Claims, 3 Drawing Figures

ONE PIECE PISTON CONNECTED TO A CONNECTING ROD FOR HIGH SPEED FOUR-STROKE CYCLE INTERNAL COMBUSTION ENGINES

The present invention relates to a one-piece piston connected to a connecting rod, for high speed four-stroke cycle internal combustion engines, especially for Diesel engines which operate in conformity with the fuel-wall application, according to which in the center of the piston head there is provided a spherical combustion chamber having a constricted opening.

Pistons of this type are generally known and disclosed, for instance, in German Pat. No. 865,683. Such pistons are made of light metal and frequently comprise a ring carrier of highly wearresistant material for the upper piston ring which is closest to the cylinder chamber. With pistons for self-drawing and particularly supercharged motors, at the combustion opening there is frequently an annular insert necessary which is made of heat-resistant material, whereby the manufacturing costs are still further considerably increased.

Pistons of the above mentioned type with a spherical combustion chamber, the axis of which coincides with the longitudinal axis of the piston, have a further drawback which considered for the entire motor likewise contributes to the manufacturing costs because in contrast to other motor structures such as combustion chamber troughs or combustion chambers partially provided in the cylinder head, turbulence chambers, antechambers, etc., a greater "compression height" is necessary. By "compression height" is meant the distance from the center of the piston bolt to the upper edge of the piston or the piston head. In view of this compression height, not only the weight of the piston is increased, but also the entire building height of the motor has to be increased with the same piston stroke because the distance from the center of the piston bolt eye to the center crankshaft eye of the connecting rod can in most all of the cases not be reduced in view of the floating of the counterweight on the piston mantle or the hub of the piston bolt through which distance the greater compression height could be equalized.

It is, therefore, an object of the present invention to provide a piston which will stand high load and will be resistant, with a connecting rod of the above mentioned type which can be reduced at low cost and will have a low compression height so that the building height of the entire motor can be reduced to customary sizes.

These and other objects and advantages of the invention will appear more clearly from the following specification, in connection with the accompanying drawings, in which.

Figure 1:
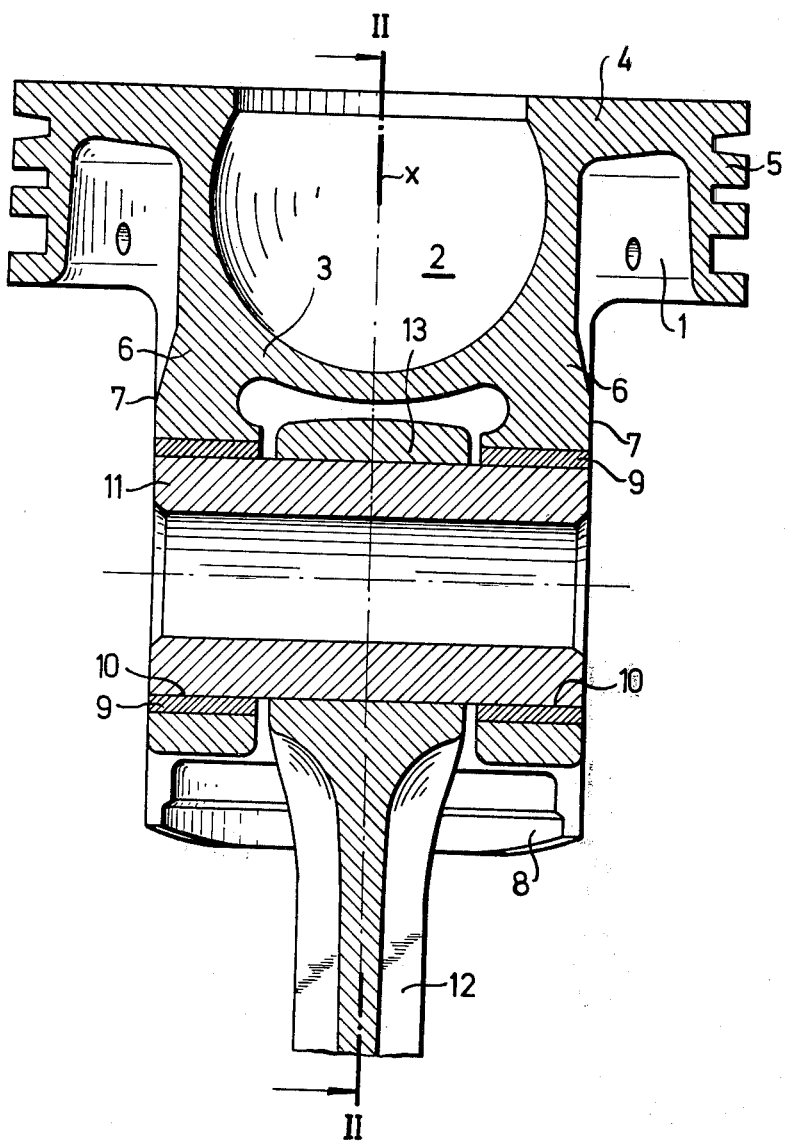
FIG. 1 represents a longitudinal section through a piston according to the invention, including the piston bolt and a portion of the connecting rod.

The piston according to the present invention with a connecting rod connected thereto is characterized primarily by a combination of the following features:

a. The piston consists of cast iron, preferably tough cast iron, spheroidal graphite cast iron or malleable cast iron.

b. The piston mantle is below the piston ring grooves in a direction perpendicular to the longitudinal axis of the piston bolt provided with two flattened surfaces which are located opposite to each other.

c. The flattened surfaces are substantially parallel to the longitudinal piston axis and are located approximately in a plane with the combustion chamber outer wall.

d. Piston bolt bearings are provided in the flattened surfaces.

e. The piston bolt is hollow and its supporting length corresponds at a maximum to the distance between the two flattened surfaces.

f. The piston bolt is by shrinking firmly connected to the connecting rod.

According to a further development of the invention, the surface of the piston is separately treated, especially by nitriding, whereby an improvement in the strength and sliding properties will be realized.

After industry has during the last few years in connection with the high speed four-stroke Diesel engines generally adopted the use of light metal pistons, it is no step back when again pistons of cast iron are used, because precisely for the present case, such cast iron pistons represent important advantages. Thus, in view of the higher strength, the wall thickness of the combustion chamber, in particular the combustion chamber bottom, may be reduced by approximately 50 percent. With a piston having a diameter of 125 millimeters, this means in particular that the combustion chamber wall instead of 8 – 9 millimeters drops with a light metal construction to approximately 4 – 5 millimeters whereby a reduction in the compression height will be possible. Furthermore, in view of the higher pressure strength of cast iron, the piston bolt bearings can be built narrower so that possibly no special bearing bushings are necessary. In view of the two flattened surfaces of the piston mantle which may, according to the feature c supra be so arranged that the gaseous forces are from the combustion chamber conveyed directly to the piston bolt bearings, a reduction in the length of the piston bolt is obtained. In addition to the shortening of the piston bolt, the shrink connection of the connecting rod eye and the piston bolt as set forth under f supra will permit a greater hollow bore in the piston bolt. As a result thereof, a saving in weight in the connecting rod eye — piston bolt is realized. Moreover, in view of the arrangement of the piston bolt bearing with bearing play in the piston, the danger of hub breaks in view of the strong flattened portion of the piston bolt will be reduced.

Finally, the shrink connection will in addition to producing a reduction in weight also bring about a reduction in the compression height because the bushing for the connecting rod will not be needed so that 2 – 3 millimeters can be saved. Moreover, the wall thickness of the connecting rod eye can be reduced by approximately 3 millimeters because the high bending stresses occurring in the connecting rod eye when the bolts are journaled in a floating manner, will be absent with the selected shrink connection.

Thus, all of the individual features listed above as elements of the above mentioned combination according to the invention serve together to solve the problem underlying the present invention. In this connection it is to be noted in particular that alone the idea to go back to cast iron, which fact represents a deviation from the development in this field, is to be considered an inventive step. A balance of weight is effected as already indicated several times by thinner wall thicknesses, narrower bearings, constriction of the piston mantle and shorter piston bolts with a greater inner bore, and smaller dimensions of the connecting rod eye.

Further advantages of a piston according to the invention can be seen in the fact that an annular carrier and an insert in the opening of the combustion chamber will, in view of the selected material, be superfluous.

The piston according to the invention is furthermore characterized in that the cold play between the piston and the cylinder bushing can, of course, be kept smaller, and it is furthermore characterized in that by a reduction of the dead chamber space in view of the smaller admissible tolerances and small piston top land, an improvement in the starting under cold conditions, especially when the motors operate in conformity with the fuel-wall application, is realized. Finally, the higher combustion chamber temperature aids in the formation of the mixture.

Relative to the machining of customary piston structures, the safety grooves and the free grinding turning operation in the direction of the bolt becomes superfluous.

Referring now to the drawings in detail, according to the structure shown in FIG. 1, the upper portion of a piston 1 comprises a combustion chamber wall 3 which forms the spherical combustion chamber 2. The combustion chamber wall 3 is by the piston top 4 connected to the annular portion 5 of the piston mantle. The combustion chamber wall is through transmission webs 6 connected to the flattened surfaces 7 of the lower piston mantle 8. These flattened surfaces 7 are parallel to the longitudinal piston axis $x$, and are located approximately in a plane with the outer combustion chamber wall 3. These flattened surfaces 7, respectively comprise a bore 10 with bearing bushings 9 for receiving a hollow piston bolt 11 onto which the connecting rod 12, and more specifically a thin connecting rod eye 13 thereof is shrunk upon. The top side of the connecting rod eye 13 is located directly below the combustion chamber wall 3 so that the distance from the center of piston bolt 11 to piston top 4 is as short as possible.

Figure 2:
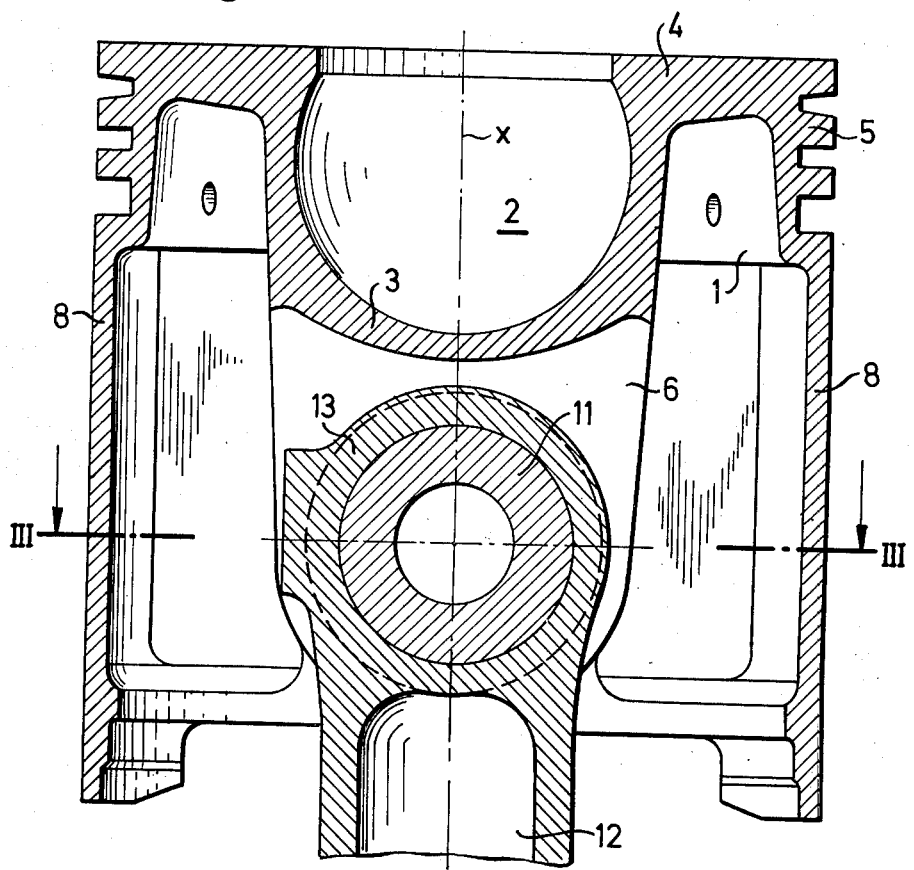
FIG. 2 represents a section taken along the line II-II of FIG. 1.

FIG. 2 shows more clearly than FIG. 1 that the piston mantle 8 at two oppositely located sides forms partially an extension of the annular portion 5 for receiving or absorbing the lateral forces and consists of one piece with said annular portion 5.

Figure 3:
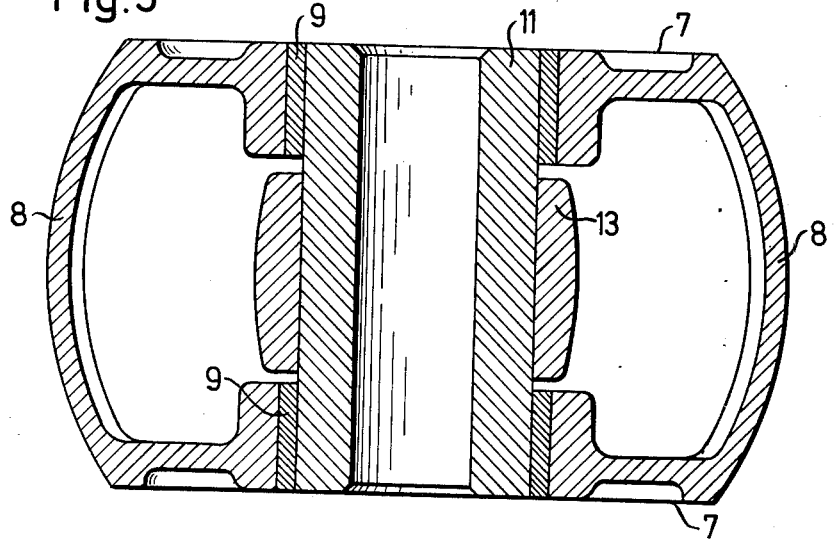
FIG. 3 illustrates a section taken along the line III-III of FIG. 2.

FIG. 3 illustrates the box shape of the lower piston mantle 8 especially the transition to the flattened surfaces 7.

It is, of course, to be understood that the present invention is, by no means, limited to the specific showing in the drawings, but also comprises any modifications within the scope of the appended claims.

What we claim is:

1. In combination for Diesel engines: a one piece piston made of cast iron having a longitudinal axis and having a piston mantle provided in a closed form with a piston bottom and a piston top with a spherical combustion chamber in the central area of said piston top and with peripheral piston ring grooves, said combustion chamber having a constricted opening, said piston also being provided with a piston skirt having two oppositely located flat surfaces located in axially spaced relationship to said piston ring grooves and radially inwardly offset with regard to said piston ring grooves, a hollow piston bolt extending in transverse direction to the longitudinal axis of said piston between said flat surfaces of said piston, said flat surfaces being located parallel to the piston longitudinal axis and extending vertically at least approximately within the plane of two diametrically opposite outer wall portions of said combustion chamber, bearing means arranged within said piston and rotatably supporting piston bolt, and a connecting rod firmly shrunk upon said piston bolt so as to be fixedly connected thereto and having overall reduction in compression height realized therewith.

2. A combination according to claim 1, in which said piston bolt has a supporting length equaling at a maximum the spacing between said flat surfaces.

3. A combination according to claim 1, in which the upper surface of said piston has been nitrided.

4. A combination according to claim 1, in which said piston consists entirely of tough cast iron.

5. A combination according to claim 1, in which said piston consists entirely of spheroidal cast iron.

6. A combination according to claim 1, in which said piston consists entirely of malleable cast iron.

* * * * *